United States Patent
Treichler et al.

(10) Patent No.: US 7,966,439 B1
(45) Date of Patent: Jun. 21, 2011

(54) APPARATUS, SYSTEM, AND METHOD FOR A FAST DATA RETURN MEMORY CONTROLLER

(75) Inventors: Sean J. Treichler, Mountain View, CA (US); Brad W. Simeral, San Francisco, CA (US); Roman Surgutchick, Santa Clara, CA (US); Anand Srinivasan, San Jose, CA (US); Dmitry Vyshetsky, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 47 days.

(21) Appl. No.: 10/997,330

(22) Filed: Nov. 24, 2004

(51) Int. Cl.
*G06F 13/36* (2006.01)
*G06F 3/00* (2006.01)
*G06F 13/12* (2006.01)
*G06F 5/00* (2006.01)
*G06F 12/00* (2006.01)
*G06F 13/00* (2006.01)
*G06F 13/28* (2006.01)

(52) U.S. Cl. ............... 710/306; 710/6; 710/58; 711/167
(58) Field of Classification Search .................. 710/306, 710/6, 58; 711/167
See application file for complete search history.

(56) References Cited

U.S. PATENT DOCUMENTS

| | | | | |
|---|---|---|---|---|
| 5,377,325 A | * | 12/1994 | Chan | 710/29 |
| 5,396,648 A | * | 3/1995 | Patsiokas et al. | 455/509 |
| 5,455,923 A | * | 10/1995 | Kaplinsky | 711/154 |
| 5,574,868 A | * | 11/1996 | Marisetty | 710/118 |
| 5,692,165 A | * | 11/1997 | Jeddeloh et al. | 713/400 |
| 5,768,544 A | * | 6/1998 | Hauck | 710/118 |
| 5,826,092 A | * | 10/1998 | Flannery | 713/324 |
| 5,850,530 A | * | 12/1998 | Chen et al. | 710/113 |
| 5,872,941 A | * | 2/1999 | Goodrum et al. | 710/309 |
| 6,044,414 A | * | 3/2000 | Gulick | 710/22 |
| 6,049,845 A | * | 4/2000 | Bauman et al. | 710/113 |
| 6,282,598 B1 | * | 8/2001 | Manabe | 710/107 |
| 6,289,406 B1 | * | 9/2001 | Chambers et al. | 710/107 |
| 6,418,538 B1 | * | 7/2002 | Garney et al. | 713/502 |
| 6,445,624 B1 | * | 9/2002 | Janzen et al. | 365/191 |
| 6,681,289 B2 | * | 1/2004 | Espeseth et al. | 711/112 |
| 6,684,278 B1 | * | 1/2004 | Sakugawa et al. | 710/107 |
| 6,684,302 B2 | * | 1/2004 | Kershaw | 711/151 |

(Continued)

FOREIGN PATENT DOCUMENTS

EP 855653 A1 * 7/1998

(Continued)

OTHER PUBLICATIONS

"NA9309255: Dual-Speed Memory Controller", Sep. 1, 1993, IBM, IBM Technical Disclosure Bulletin, vol. 93, Iss. 9A, pp. 255-256.*

(Continued)

*Primary Examiner* — Faisal M Zaman
(74) *Attorney, Agent, or Firm* — Cooley LLP

(57) ABSTRACT

A system controller includes a memory controller and a host interface residing in different clock domains. There is a time delay between the time when the memory controller issues a read command to a memory and the data becoming present and available at the host interface. The memory controller generates an alarm message at or near the time that it issues the read command. The alarm message indicates to the host interface the time that the data is available for transfer to a host.

21 Claims, 8 Drawing Sheets

U.S. PATENT DOCUMENTS

| | | | |
|---|---|---|---|
| 6,715,042 B1* | 3/2004 | Mirza et al. | 711/151 |
| 6,728,808 B1* | 4/2004 | Brown | 710/107 |
| 6,792,496 B2* | 9/2004 | Aboulenein et al. | 710/306 |
| 6,816,954 B2* | 11/2004 | Solomon | 711/167 |
| 6,851,004 B2* | 2/2005 | Keller et al. | 710/107 |
| 6,877,078 B2* | 4/2005 | Fujiwara et al. | 711/167 |
| 6,918,016 B1* | 7/2005 | Magro | 711/154 |
| 6,941,425 B2* | 9/2005 | Osborne | 711/154 |
| 7,111,111 B2* | 9/2006 | Neuman et al. | 711/105 |
| 7,385,861 B1* | 6/2008 | Zhu | 365/194 |
| 7,505,349 B2* | 3/2009 | Hearn et al. | 365/222 |
| 7,512,762 B2* | 3/2009 | Gower et al. | 711/167 |
| 7,676,684 B2* | 3/2010 | Ando | 713/400 |
| 7,724,602 B2* | 5/2010 | Hur et al. | 365/226 |
| 2003/0172235 A1* | 9/2003 | Letey et al. | 711/138 |
| 2004/0210711 A1* | 10/2004 | Kakihara et al. | 711/112 |
| 2005/0286506 A1* | 12/2005 | LaBerge | 370/363 |
| 2008/0091906 A1* | 4/2008 | Brittain et al. | 711/167 |

FOREIGN PATENT DOCUMENTS

| | | | |
|---|---|---|---|
| JP | 11167515 A * | 6/1999 | |
| JP | 2002007206 A * | 1/2002 | |
| JP | 2003050739 A * | 2/2003 | |
| JP | 2003091453 A * | 3/2003 | |
| JP | 2006092077 A * | 4/2006 | |
| WO | WO 2010093529 A2 * | 8/2010 | |

OTHER PUBLICATIONS

"NN940793: Clock Mode for Reading Memory", Jul. 1, 1994, IBM, IBM Technical Disclosure Bulletin, vol. 37, Iss. 7, pp. 93-94.*

Cuppu et al., "Concurrency, latency, or system overhead: Which has the largest impact on uniprocessor DRAM-system performance?," Computer Architecture, 2001. Proceedings. 28th Annual International Symposium on , pp. 62-71, 2001.*

Grayson et al., "Characterizing instruction latency for speculative issue SMPs: a case study of varying memory system performance on the SPLASH-2 benchmarks," Workload Characterization: Methodology and Case Studies, 1998 , pp. 114-121, 1999.*

JEDEC Standard "Double Data Rate (DDR) SDRAM Specification", Jan. 2004.

JEDEC Standard "DDR2 SDRAM Specification", Jan. 2004.

Tom Shanley, Unabridged Pentium 4: IA32 Processor Genealogy, MindShare, Inc. (2004), Chaps. 44-55.

* cited by examiner

APPARATUS, SYSTEM, AND METHOD FOR A FAST DATA RETURN MEMORY CONTROLLER

FIELD OF THE INVENTION

The present invention is generally related to system controllers, such as North Bridge chips, for interfacing a memory with a central processing unit. More particularly, the present invention is directed towards a system controller for improving the speed with which data may be returned.

BACKGROUND OF THE INVENTION

System controller chips, sometimes known as "North Bridge" chips, are used to interface a memory with a central processing unit (CPU) and other components, such as a graphics processing unit (GPU). The North Bridge chipset architecture is a well-known architecture to interface a CPU, memory, and other components using a dedicated North Bridge chip and corresponding South Bridge chip. Recently, however, the functionality of North Bridge chips has been expanded. For example, the function of a North Bridge chip can be included within chips providing other functions. Some references use the term "system controller" to denote a more generic application of the function conventionally provided by a North Bridge chip. Consequently, as used in this application, a system controller is a controller that provides the function of a North Bridge chip in regards to interfacing a CPU and a memory.

FIG. 1 illustrates a prior art system having a CPU 100, North Bridge chip 105 including a memory controller interface 110, and dynamic random access memory (DRAM) memory 115. DRAM memory 115 may, for example, be comprised of dual inline memory modules (DIMMS) including static dynamic random access memory (SDRAM). The JEDEC Solid State Technology Association has several standards describing protocols and standard signal definitions for the operation of SDRAM memory, such as JEDEC Standard "Double Data Rate (DDR) SDRAM Specification", published January 2004 and JEDEC Standard "DDR2 SDRAM Specification," published January 2004, the contents of each of which are hereby incorporated by reference in their entirety. DDR DRAM typically includes a number of pins with specified functions. For example, the DQ pins are bidirectional input/output data bus pins that are used for input and output of data. During a read operation, data read from the selected memory cell appears at the DQ pins when the access is complete and the output is enabled. The DQS pin is a data strobe pin that is output with read data and input with write data. The DQS is commonly edge aligned with read data and center aligned with write data. A chip select (CS) pin masks all commands when the complement of CS has a logical high value. DRAM command inputs typically include a row address strobe (RAS) input, a write enable (WE) input, and a column address strobe (CAS). CAS is an active low signal. The CAS# signal is the inverted version of the CAS signal. The CAS# input is used to latch the column address and is one of the command signals used to initiate the read or write operation. There is a CAS latency (CL) associated with the latency between the receipt of a read command at the DRAM and the output of data. Thus, for example, after a DRAM receives command signals for a read operation, there will be a read delay (RL), corresponding to the CL and any additive latency (AL) before valid data appears on the DQ pins.

Other components, such as a GPU 120 and South Bridge chip 125 may also be coupled to North Bridge chip 105. CPU 100 is coupled to North Bridge chip 105 via a front side bus (FSB) that includes respective bus interface units (BIU) in CPU 100 and North Bridge chip 105. North Bridge chip 105 is coupled to DRAM memory 115 via a memory bus 130.

The FSB typically operates according to a FSB protocol. An exemplary FSB protocol is described in the book by Tom Shanley, Unabridged Pentium 4: IA32 Processor Genealogy, MindShare, Inc. (2004), the contents of which are hereby incorporated by reference. FSB protocols typically include a sequence of transaction phases that proceed in a predefined order, such as an arbitration phase, request phase, error phase, snoop phase, response phase, and data phase. For example, for a read request issued from CPU 100, a request agent in the BIU of CPU 100 issues a read request to a response agent in the BIU of North Bridge 105. FSB protocols include a response that indicates that the response agent will provide the data. The data phase of a transaction cannot be completed until the request and response agents in the FSB are ready to transfer data.

Arrow 135 illustrates a data read request path. The data read request path corresponds to a read request issued from CPU 100 that is passed through memory controller interface 110 in North Bridge chip 105 to DRAM memory 115. Arrow 140 illustrates a data return path from memory 115 back to CPU 100 through North Bridge chip 105. Conventionally, the time delay along the data return path includes several factors, which are illustrated in simplified form in FIG. 2, which is not to scale. First, there are analog delays associated with the latency of the memory bus for transmitting a request from North Bridge chip 105 to memory 115 and for returning data from DRAM memory 115 to North Bridge chip 105. Second, there is a CAS latency within DRAM memory 115 to respond to a data request. Additionally, there is a synchronization delay associated with the handover between the memory clock domain and the CPU clock domain. The DRAM data must be synchronized to a clock edge of the FSB in order for the FSB response agent to receive the data for transfer. As an example, the FSB clock may have a first clock rate associated with the CPU clock domain, such as 266 MHz, whereas the DRAM memory clock operates at a different clock rate, such as 333 MHz. Conventionally, a synchronization step is required to perform a handover between the clock domains. For example, a sync handoff module 150 may be used to identify a crossover between an edge of the memory clock (operating at a memory clock rate) and an edge of the front side bus clock (operating at a different clock rate associated with the CPU clock domain) to perform the handover between memory clock domains. Additionally, once the data becomes available in the CPU clock domain, there may be a number of cycles required to prepare to send the data. For example, a data scheduler (not shown) may need to verify that the data has arrived and prepare to send the data out according to a bus protocol.

As a result of all the combined latencies, the read return latency is greater than desired for many applications. The read return latency, for example, introduces CPU clock cycles in which the CPU is waiting for data to return before it can complete an operation.

Therefore, what is desired is an improved system, apparatus, and method for a fast data return memory controller.

SUMMARY OF THE INVENTION

A system controller serves as an interface between a host, such as a central processing unit, and a memory. The system controller implements the function of a North Bridge interface and includes a memory controller and a host interface which reside in two different clock domains. There is a time delay between when the memory controller issues a read command to a memory and when the data is returned to the host interface. The memory controller generates an alarm message that indicates to the host interface when the data will be available for transfer. As a result, the host interface can schedule a data transfer before the data has been returned to it, improving the speed of the system controller.

One embodiment of a system controller includes a host interface disposed in a first clock domain having a first clock rate; a memory controller for interfacing with a memory, the memory controller disposed in a second clock domain having a second clock rate associated with the memory, the memory controller receiving read requests passed on from the host interface; a data return path for data to be returned from the memory to the host interface; the memory controller generating an alarm message indicative of a transfer time when a read command issued in the second clock domain to the memory for a particular read request will result in data being available in the first clock domain; and the host interface receiving the alarm message and scheduling a data transfer according to the transfer time for the particular read request.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
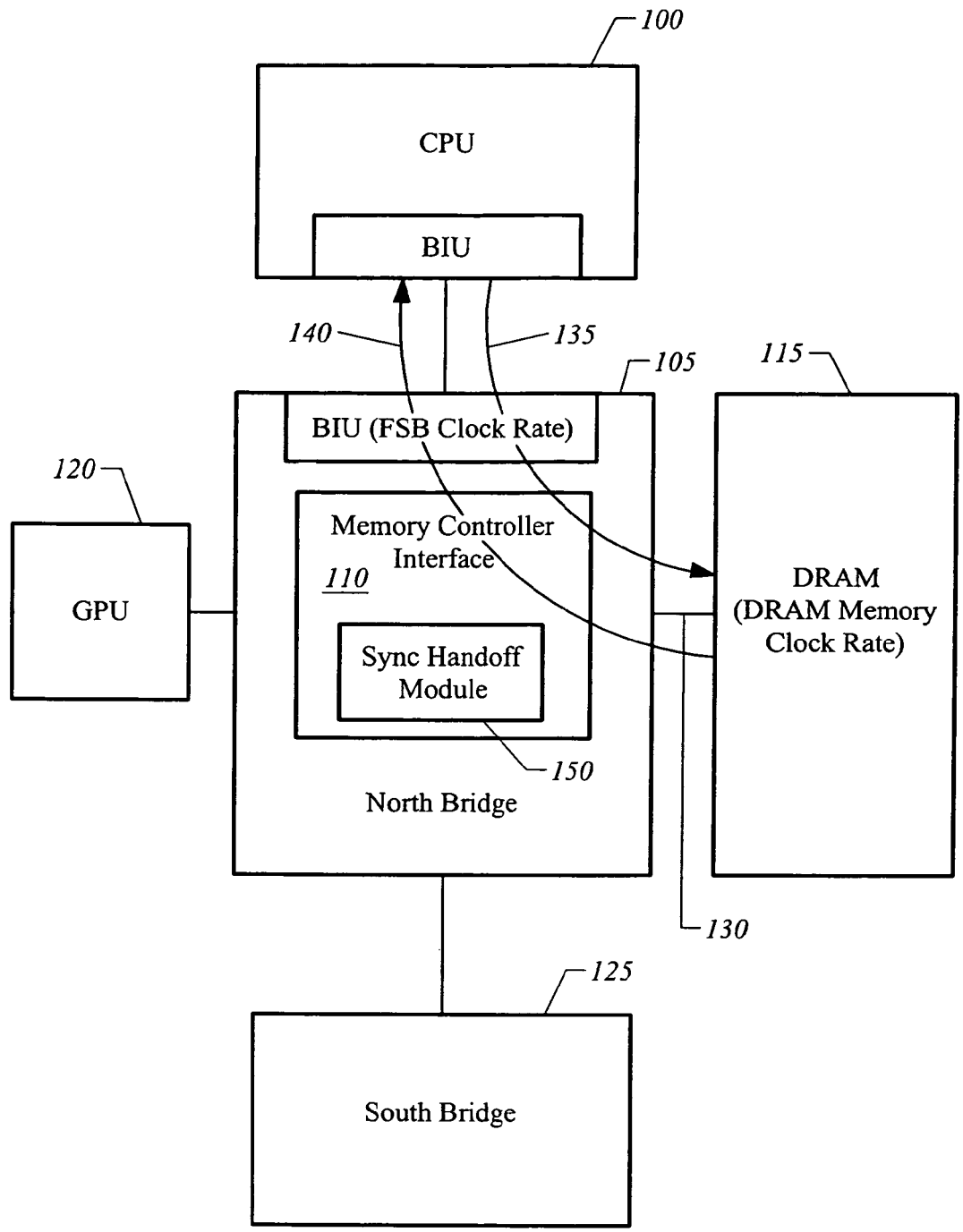
FIG. 1 is a block diagram of a prior art system controller.
Figure 2:
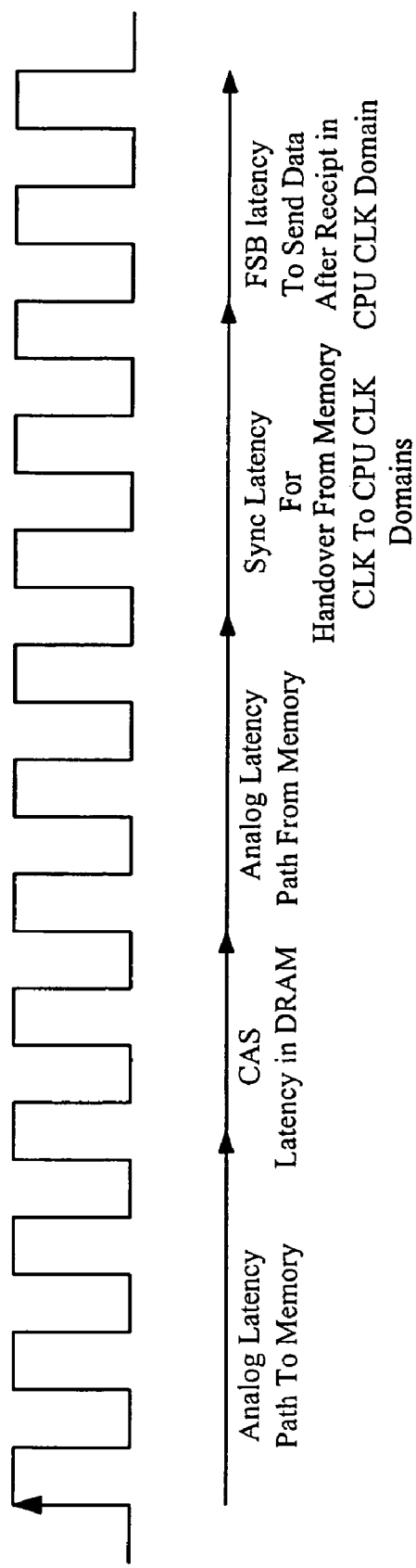
FIG. 2 illustrates time delays associated with the data return path for the system controller of FIG. 1.
Figure 3:
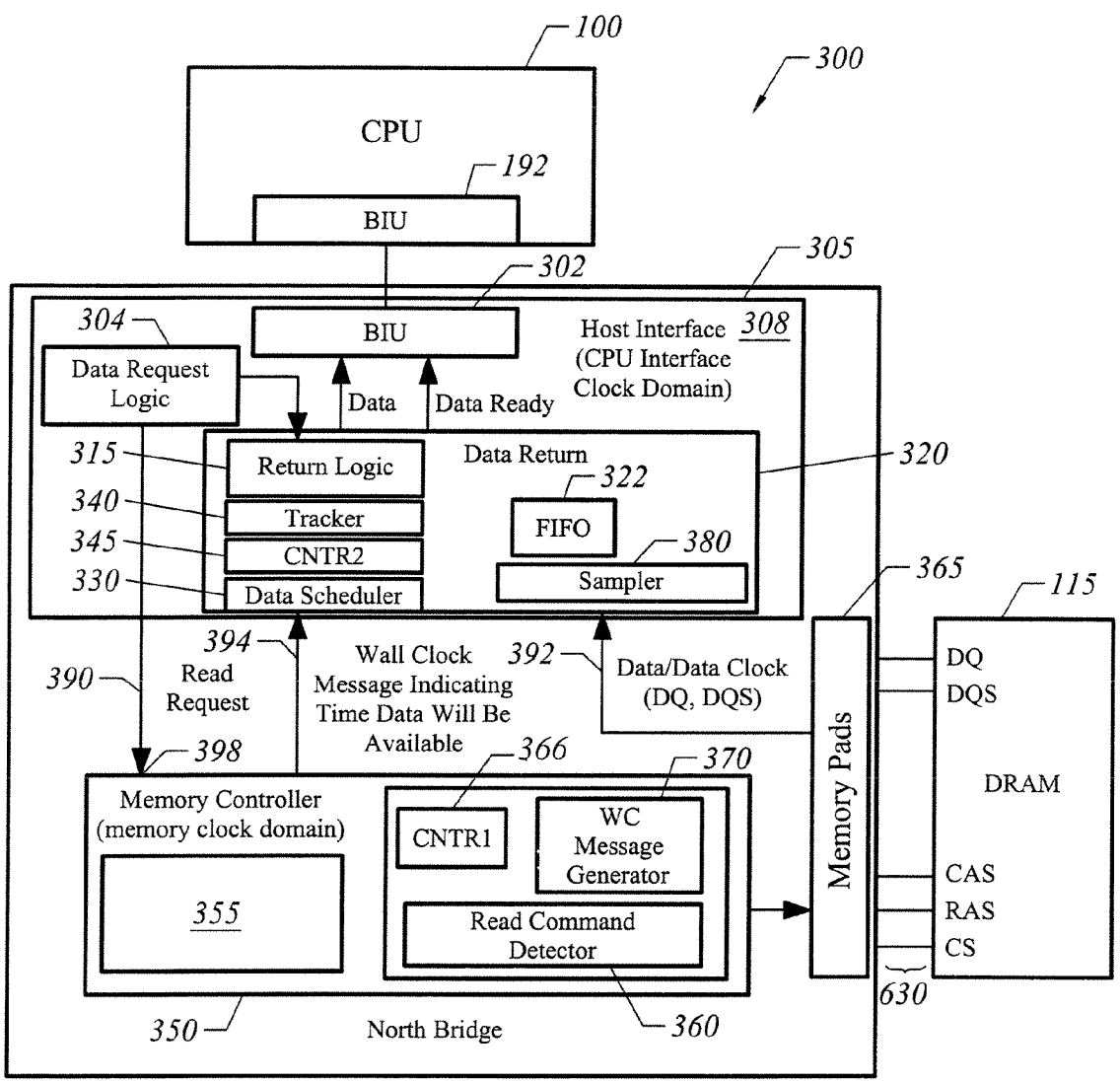
FIG. 3 illustrates a system controller in accordance with one embodiment of the present invention.

FIG. 3 illustrates an exemplary system 300 in accordance with one embodiment of the present invention. A system controller 305 serves as an interface between a host, such as central processing unit (CPU), and a memory, such as dynamic random access memory (DRAM) or static dynamic access memory (SDRAM). System controller 305 may be implemented as part of a chip or a chipset. In one embodiment, system controller 305 is implemented as a North Bridge chip that serves as an interface to other components (not shown), such as graphics processing units (GPUs).

System controller 305 includes a host interface 308 and a memory controller 350. Host interface 308 includes a bus interface unit (BIU) 302 for receiving read requests from a BIU 192 in central processing unit 100. BIU 302 and BIU 192 operate according to a bus protocol. In some embodiments, BIU 302 is compliant with a front side bus protocol. Coupled to BIU 302 is data request logic 304 for receiving and keeping track of read requests received from CPU 100 and a data return 320 for data returned from a memory 115.

Memory controller 350 has memory interface pads 365 that serve as an input/output interface. A memory bus 630 communicatively couples pins on memory 115 to corresponding pads in memory interface pads 365.

Memory controller 350 receives read requests 390 issued from data request logic 304 via an input 398. Memory controller 350 asserts read commands on memory interface pads 365. For a SDRAM memory, the read command includes a CAS signal. A data return path 392 permits data and data clock signals (e.g., DQ and DQS signals for SDRAM memory) received at memory pads 365 to be sampled by data return 320 using sampling logic 380. In one embodiment a first-in, first-out (FIFO) 322 is provided in data return 320 for storing returned data.

Figure 4:
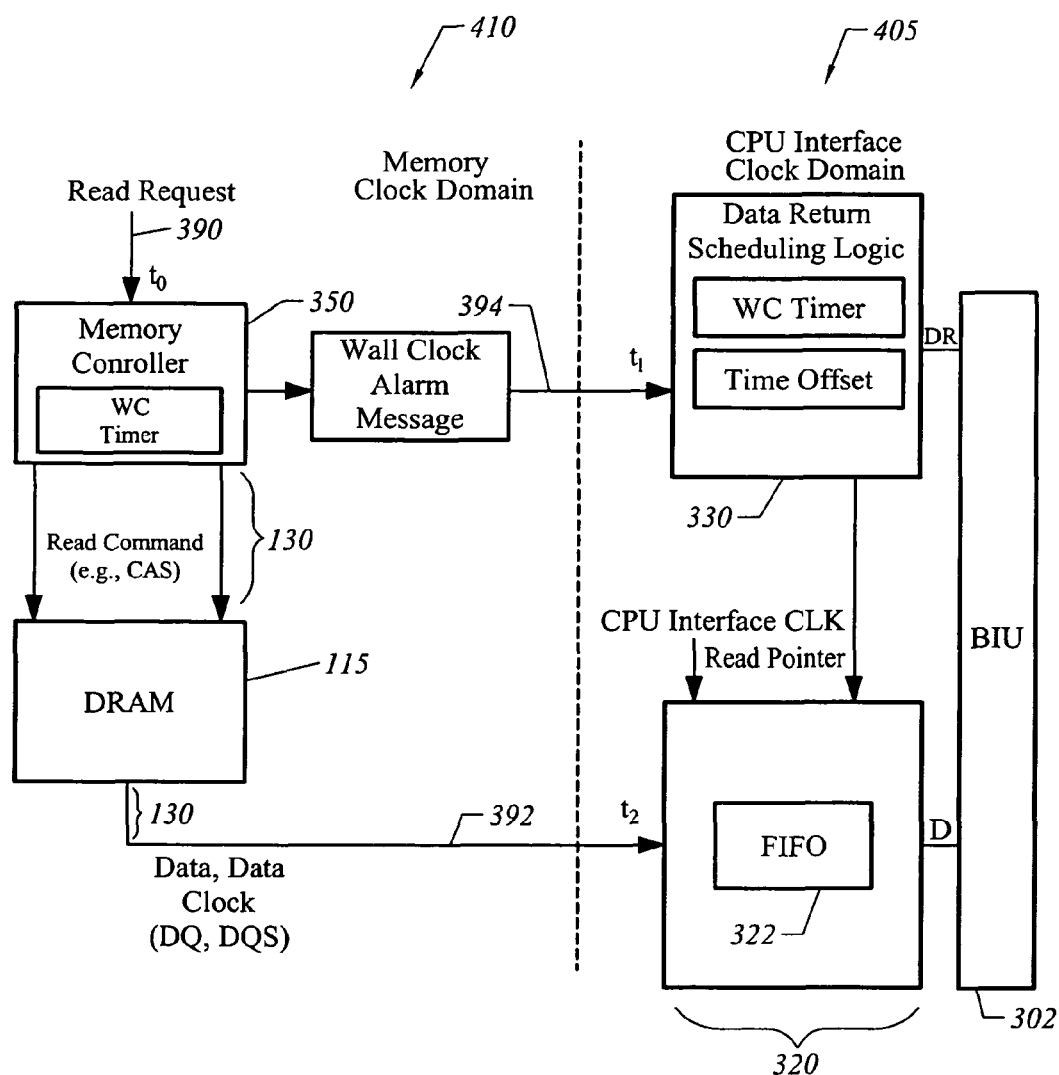
FIG. 4 illustrates the two clock domains within the system controller of FIG. 3.

FIG. 4 is a diagram with some of the components in FIG. 3 omitted and rearranged to illustrate a source clock domain 410 of a memory controller and a destination clock domain 405 of the host interface. A first clock domain 405 is a CPU host interface clock domain 405 associated with components that act as host interface 308. The first clock domain 405 has a clock rate that permits, for example, receipt of requests for data from CPU 100 (not shown in FIG. 4) and the transfer of data back to CPU 100 to fulfill the request. This first clock rate may, for example, be a clock rate associated with BIU 302 or an integer multiple thereof. Thus, in one embodiment the first clock domain is a front side bus (FSB) clock domain operating at the FSB clock rate or an integer multiple thereof. A second clock domain 410 is associated with components associated with memory controller 350. The second clock domain has a clock rate that permits, for example, issuing commands for reading/writing data to memory 115.

A particular data request 390 received by memory controller 350 at some time $t_0$ triggers memory controller 350 to generate read command signals, such as a CAS signal. There will be a time delay for memory 115 to receive and respond to the command signals. After some time delay, memory 115 will generate data (e.g., DQ signals) and data clock signals (e.g., DQS signals) that travel along a data return path 392 to data return 320.

Memory controller 350 generates a wall clock alarm message 394 that alerts data return 320 when data will be available. The term "wall clock" denotes a clock time that may be understood as a reference time in the host interface 308 and the memory controller 350, in analogy to a clock hanging on a wall that different observers may read. The wall clock alarm message may be in a packet format or other types of message formats. The wall clock alarm message may be generated at, or near, the time when memory controller 350 decides to assert read command signals. The circuitry for handover of the wall clock alarm message 394 from the memory clock domain 410 into the CPU clock domain 405 is preferably selected to require a comparatively short time compared with the time delays along the data return path. This permits the wall clock alarm message 394 to arrive in the data return 320 at a time $t_1$ that is earlier than the time $t_2$ when data arrives in data return 320.

The wall clock alarm message 394 alerts data return 320 of a time when data will be returned. This permits data return 320 to schedule returning the data as early as the first clock cycle in the CPU interface clock domain 405 for which the data is present and available (i.e., the data is present and in a stable state). The scheduling may include, for example, scheduling a data ready (DR) signal to alert BIU 302 that data is ready and asserting a read pointer or other signal to enable data (D) to be read by BIU 302. The use of wall clock alarm messages eliminates a number of clock cycles that would conventionally be required to perform an asynchronous handover of data between clock domains, confirm that data has arrived in the data return, and perform any preliminary set up or initiation of protocol messages prior to data transfer to CPU 100. As a result, data return latency is improved in the present invention.

Referring back to the more detailed illustration of FIG. 3, in one embodiment, memory controller 350 includes a read command detector 360 that detects when memory controller 350 asserts read command signals, (such as a CAS signal for DRAM memory) at interface 365. A local counter 366 maintains a wall clock time in the memory clock domain. A wall clock message generator 370 generates wall clock alarm messages 394.

Wall clock alarm message 394 is received by a data scheduler 330 in host interface 308. Data scheduler 330 includes an associated tracker 340, which may be implemented as a state machine. A local counter 345 in the CPU clock domain permits tracker 340 the capability to convert a wall clock message indicating an alarm time in the memory clock domain into a time in the CPU clock domain. Local counter 345 operates at a rational multiple of the clock rate of local counter 366 in the memory clock domain and may also include a differential time offset.

In one embodiment, tracker 340 also determines an offset to the alarm time that is used to determine a safe clock cycle in the CPU clock domain for which data will be returned and available for transfer in data return 320. Tracker 340 may generate an offset to an alarm time using any fixed (constant) offset. Additionally, it is desirable to provide a mechanism to optimize the response of tracker 340 for different applications in order to calculate the earliest safe clock cycle in the CPU clock domain for which data will be returned and available in data return 320. Thus, in some applications it may be desirable to provide the ability to fine-tune the response of tracker 340, such as with configurable offsets (e.g., programmable offsets). Additionally, in some applications it is desirable for tracker 340 to dynamically monitor variables, such as attributes of system controller 305 or of read requests, and determine a fine adjustment to the offset that takes into account variables that may effect the time when all of the requested data will be returned and available for data transfer via BIU 302. In one embodiment, return logic 315 includes a queue of read requests awaiting data, including attributes associated with each read request. As one example, tracker 340 may track a data size of a read request 390. In this example, tracker 340 calculates an offset to the alarm time that includes any fine adjustments required to account for the size of the data request and/or the manner in which the bus protocol of BTU 302 transfers data.

As previously discussed, wall clock alarm message 394 is an alarm message that indicates when data will be available for data transfer. For a particular implementation, the time delay between an assertion of a read command by memory controller 350 and data becoming present and stable in data return 320 would be calculated. For example, the time delay includes all of the fixed delays between the time that a read command is issued at memory interface pads 365 to when data is returned to data return 320, such as the inbound and outbound analog delays of memory bus 630, CAS latency in memory 115, and any other digital or analog delays along the data return path. Additionally, any fixed clock skew within system controller 305 may be accounted for as an additional delay. There are several potential sources of clock skew. Within a single clock domain, clock skew may result from the generation of different versions of the same clock. Between the two clock domains, generation of one clock from the other clock (e.g., using a PLL to convert one clock rate into another clock rate) may result in a clock skew between the clocks in the two different clock domains. Note that in the present invention that any fixed intra-domain or fixed inter-domain clock skew may be accounted for as an additional delay.

The wall clock alarm message 394 may take a variety of different forms, depending upon which portion of the time delay that it is adjusted for. As one example, the wall clock alarm message may be an absolute time when data will be available in data return 320. As another example, the wall clock alarm time may be further adjusted for any latency associated with data return 320 acting upon the information of the wall clock alarm message, i.e., a "wake up" time that accounts for the number of clock cycles required for data return 320 to prepare to transfer data. As still another example, the wall clock time may also comprise the absolute time the message was sent in the memory clock domain, with data scheduler 330 adding an offset to account for the time delay along the data return path.

To facilitate synchronization, in some embodiments a clock conversion module 355 is used to generate the memory domain clock from a CPU clock domain clock signal using, for example, a phase locked loop (PLL) and associated logic. This permits the two clock rates to have a fixed phase relationship and a rational relationship of clock rates (e.g., a ratio that may be expressed as a ratio of integers, such as 3 to 2). In one embodiment, clock conversion module 355 acts at some initial time to align clock edges in the two domains. Clock edges in the two domains will then periodically align at periodic intervals due to the initial alignment of clock edges and the rational relationship of clock rates. This periodic alignment facilitates handover of requests and data between the two clock domains. In one embodiment, additional logic (not shown) identifies the periodically aligned clock edges for which a handover may be safely performed. This periodic alignment of clock edges of the two clock domains can be described as pseudo-synchronous synchronization of the two clock domains.

Figure 5:
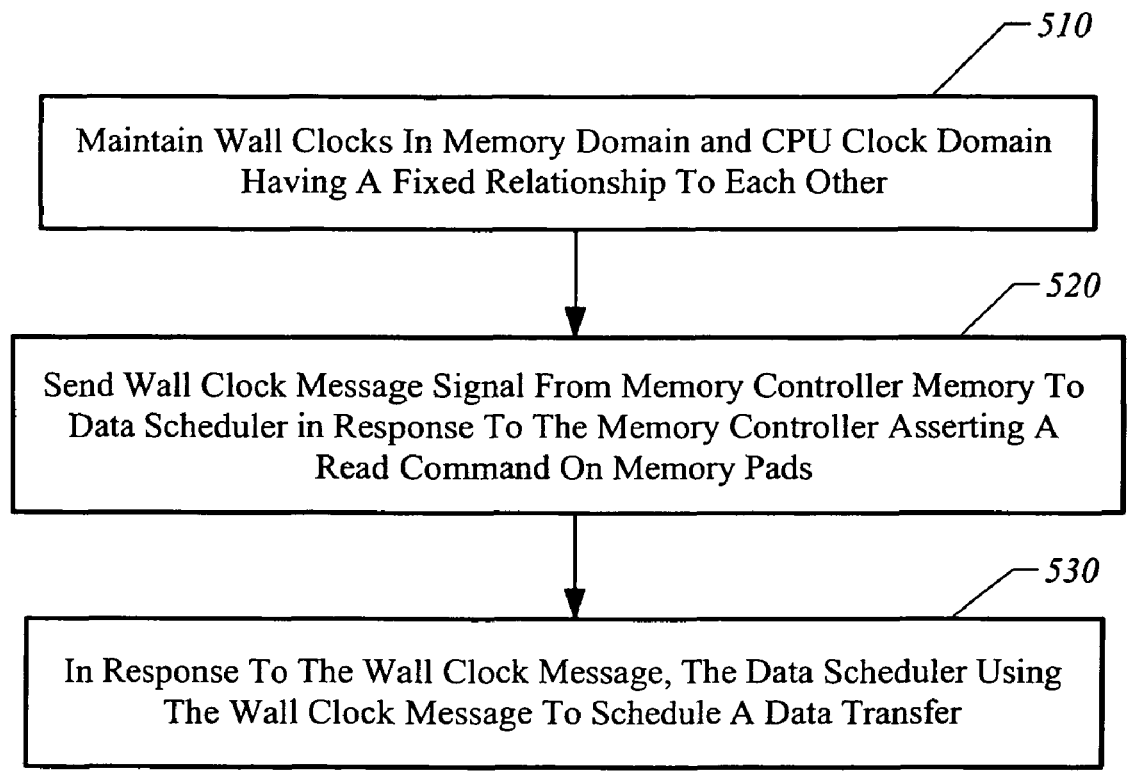
FIG. 5 is a flow chart of a method of improving data return in a system controller in accordance with one embodiment of the present invention.

FIG. 5 is a flow chart illustrating a method in accordance with one embodiment of the present invention. Wall clocks are maintained 510 in the memory domain and the CPU clock domain having a fixed relationship to each other. A wall clock alarm message is sent 520 from the memory domain to the CPU domain in response to the memory controller interface asserting a read command on the memory interface. In response to the wall clock message, the scheduler in the CPU clock domain schedules 530 a data transfer at a time when the requested data will be available for a transfer, which may be as early as the first clock edge in the CPU clock domain for which data is present and available.

Figure 6:
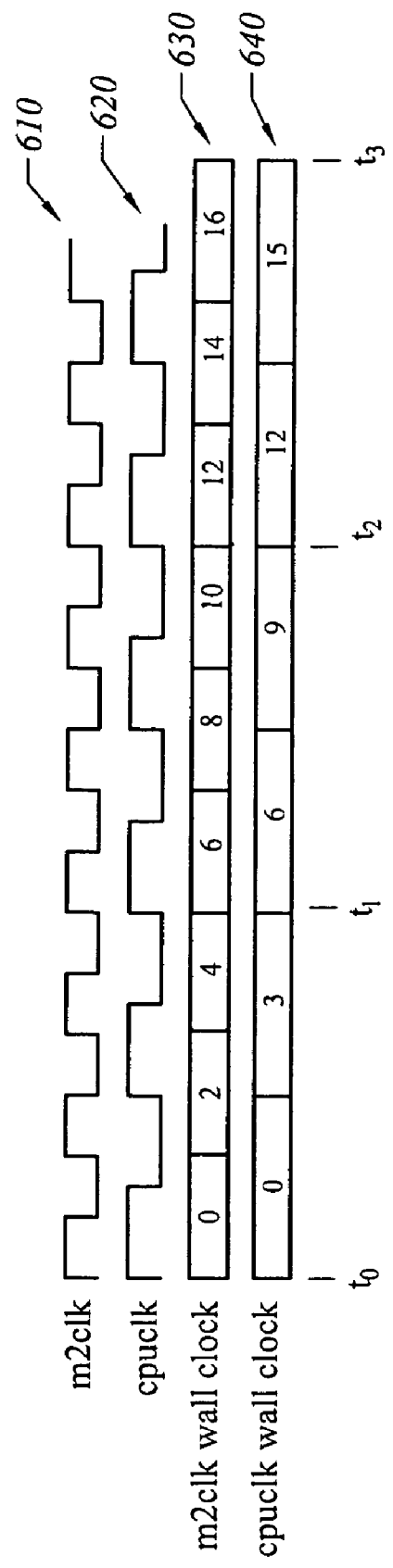
FIG. 6 illustrates wall clock signals in two different clock domains in accordance with one embodiment of the present invention.

FIG. 6 illustrates exemplary wall clock signals in the memory clock domain and the CPU clock domain. Signal 610 corresponds to a memory clock (m2clk); signal 620 corresponds to a CPU clock (cpuclk); signal 630 corresponds to a wall clock in the memory clock domain (m2clk wall clock); and signal 640 corresponds to a wall clock in the CPU clock domain (cpuclk wall clock). Note that the wall clocks in the two domains are synchronized at some initial time, t0. Subsequently, the two wall clocks will have a crossover of leading clock edges at times t1, t2, and t3 that occurs with a periodicity determined by the two clock rates. Thus, a time measured in the memory clock domain may be translated into a time in the CPU clock domain.

Figure 7:
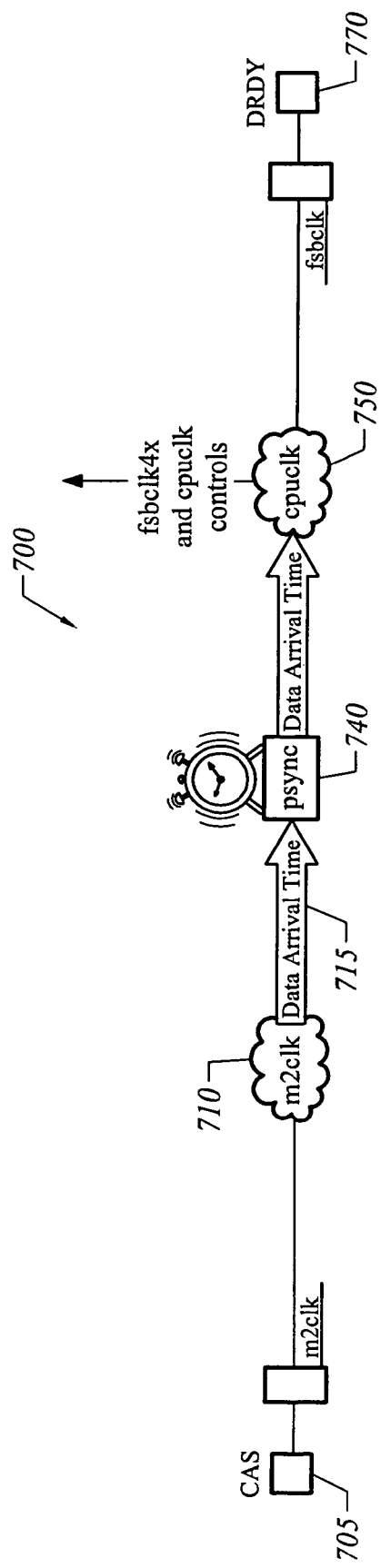
FIG. 7 illustrates a portion of a system controller in accordance with one embodiment of the present invention.

FIG. 7 illustrates some aspects of wall clock message generator 370 and the generation of data ready signals. DRAM clock cloud 710 comprises the circuit elements for asserting the CAS signal on a CAS pad 705 and sending an alarm message 715 from the memory clock domain to the CPU clock domain 750 to alert the CPU when data will arrive. In the CPU clock domain, a data ready (DRDY) signal 770 is generated by the data scheduler (not shown in FIG. 7). As indicated by circuit module 740 (psync), a portion of the circuitry performs a handover of the alarm message 715 on a periodically aligned clock edge between the DRAM clock domain and the CPU clock domain.

Figure 8:
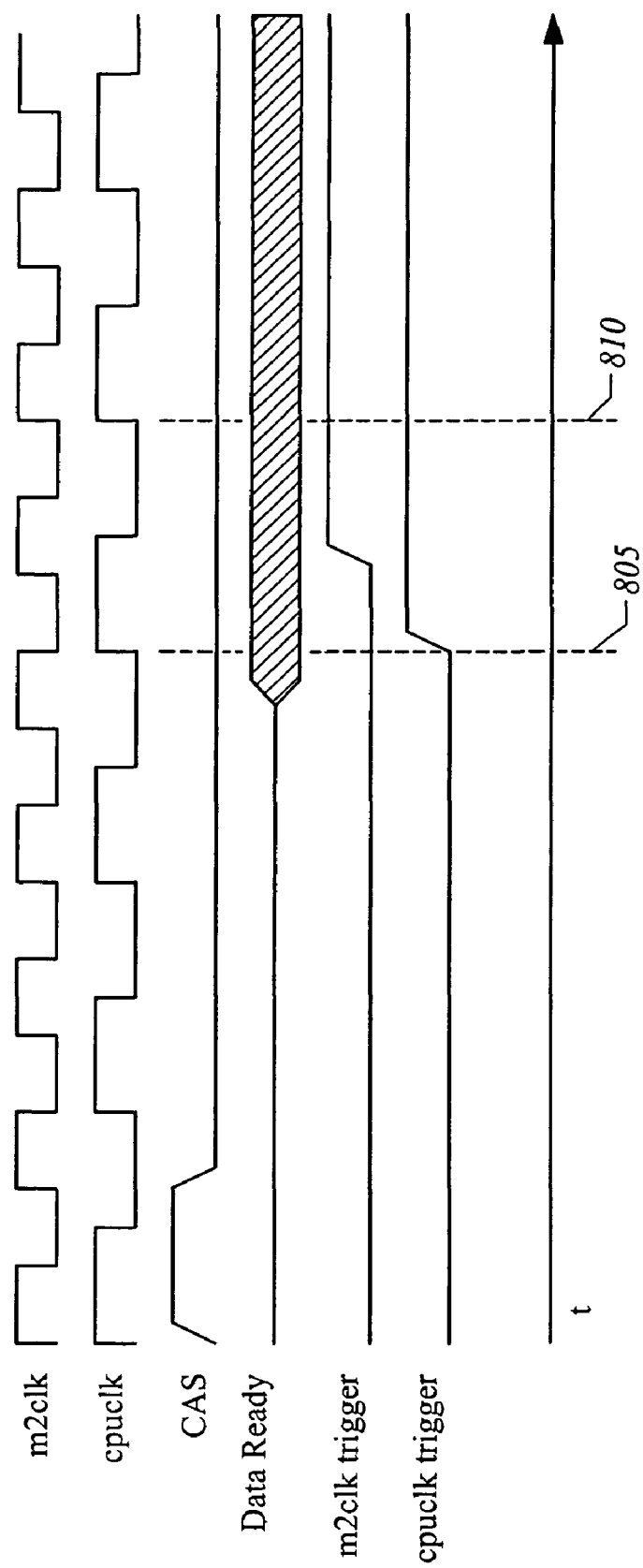
FIG. 8 illustrates signals for the system controller of FIG. 7.

FIG. 8 illustrates exemplary clock signals for the system controller of FIG. 7. In the present invention there is a direct data path between the DRAM and the host interface such that the data does not have to be handed over from the memory controller to the host interface. The data is available to be transferred on the first leading edge of the trigger signal cpuclk trigger, as indicated by dashed line 805. By way of contrast, if synchronous handover of data was utilized to handover data between memory clock domain and the CPU clock domain, the data might not be capable of being transferred until a crossover of memory clock edges and CPU clock edges, as indicated by dashed line 810. Thus, an additional benefit of the present invention is that it can be used to eliminate the time that would be conventionally required to perform a handover of data between two clock domains.

While the present invention has been described in regards to an example of a system controller 305 acting as an interface between a CPU and a memory, more generally the present invention may be applied to a variety of request buses. In particular, the present invention is also applicable to other types of interfaces that have a fixed latency for a request to generate a response.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for using a system controller disposed in a single chip having a first clock domain and a second clock domain, the method comprising:
   receiving a read request in the first clock domain of a host interface of said system controller having a first clock rate;
   passing said read request into the second clock domain of a memory controller of said system controller associated with accessing a memory via a memory bus, said second clock domain having a second clock rate;
   in said second clock domain, said read request triggering said memory controller to assert a read command to said memory via said memory bus to fulfill said read request and the read request further triggering said memory controller to also send a delay-adjusted alarm message in said second clock domain to said host interface such that the delay-adjusted alarm message includes an indication of a time in the future when data to fulfill said read request will be returned from said memory to said first clock domain in response to the read command asserted on said memory bus and the indication is adjusted based on a time delay between said read request and said data becoming present and stable in said host interface,
   wherein triggering said memory controller to send said delay-adjusted alarm message includes calculating said time delay using said memory controller;
   in said first clock domain, said host interface receiving said alarm message at a time before the data is ready for transfer, converting said alarm message in said second clock domain into an alarm message in said first clock domain, and dynamically monitoring attributes of said read request to generate a programmable offset to said alarm message in said first clock,
   wherein said host interface utilizes said alarm message to schedule a data ready signal to transfer data at an earliest safe clock cycle in the first clock domain without requiring a synchronous handover within the chip of data fulfilling said read request between said clock domains prior to scheduling the data ready signal.

2. The method of claim 1, further comprising: maintaining a first counter in said first clock domain and a second counter in said second clock domain such that an alarm time in said second clock domain is interpreted in said first clock domain.

3. The method of claim 1, wherein said first clock domain is associated with a front side bus interface and said receiving a read request comprises receiving a read request on said front side bus interface from a central processing unit.

4. The method of claim 1, wherein said delay occurs in response to at least one of: an inbound memory bus delay, a CAS latency associated with said memory, or an outbound memory bus delay.

5. The method of claim 1, further comprising accounting for a latency of said first clock domain to respond to said alarm message.

6. The method of claim 1, further comprising sampling read data from said memory.

7. The method of claim 1, wherein dynamically monitoring attributes of said read request to generate a programmable offset comprises monitoring a data size of said read request.

8. A system controller disposed in a chip for a host to read stored data, comprising:
   a host interface in the chip disposed in a first clock domain having a first clock rate;
   a memory controller in the chip for interfacing with a memory, said memory controller disposed in a second clock domain having a second clock rate associated with said memory, said memory controller receiving read requests passed on from said host interface;
   a data return path for data to be returned from said memory to said host interface;
   said memory controller being triggered by a received read request to assert a read command to said memory via a memory bus to fulfill said read request and the read request further triggering said memory controller to also send a delay-adjusted alarm message in said second clock domain to said host interface such that the delay-adjusted alarm message includes an indication,
   wherein said indication is a calculated value of a time in the future when data to fulfill said read request will be returned from said memory to said first clock domain in response to the read command asserted on said memory bus and said indication is adjusted based on a time delay between said read request and said data becoming present and stable in said host interface; and said host interface receiving said alarm message in said second clock domain at a time before the data is ready for transfer, and dynamically monitoring attributes of said read request to generate a programmable offset to said alarm message in said first clock domain, wherein said host interface utilizes said alarm message to schedule a data ready signal to transfer data at an earliest safe clock cycle in the first clock domain without requiring a synchronous handover within the chip of data fulfilling said read request between said clock domains prior to scheduling the data ready signal.

9. The system controller of claim 8, wherein said host interface comprises a front side bus interface.

10. The system controller of claim 8, wherein said host interface comprises a data return for receiving data from said data return path.

11. The system controller of claim 10, wherein said safe clock cycle comprises an earliest clock cycle in said first clock domain for which data to fulfill said particular read request will be returned and available.

12. The system controller of claim 11, wherein said data return determines said earliest clock cycle based upon said alarm message and a size of said particular read request.

13. The system controller of claim 11, wherein said memory is a random access memory having DQ and DQS pins carrying DQ and DQS signals and said data path samples said DQ and DQS signals.

14. The system controller of claim 8, wherein each clock domain is locked to the other with a fixed ratio.

15. The system controller of claim 8, wherein each clock domain maintains a local counter, whereby an alarm time in said second clock domain is adapted to be translated into a time in said first clock domain.

16. The system controller of claim 8, wherein said attributes of said read request comprise a data size of said read request.

17. A chip acting as a North Bridge interface between a central processing unit and a memory, the chip comprising:

a host interface in the chip having a front side bus interface disposed in a front side bus clock domain having a first clock rate, said front side bus interface adapted to receive read requests from said central processing unit and return data to said central processing unit;

a memory controller in the chip for interfacing with said memory, said memory controller disposed within a memory clock domain having a second clock rate, said memory controller receiving read requests from said front side bus interface;

a data return path for returning data from said memory to a data return within said front side bus clock domain;

said memory controller being triggered by a received read request to assert a read command to said memory via a memory bus to fulfill said read request and the read request further triggering said memory controller to also send a delay-adjusted alarm message in said memory clock domain to said host interface such that the delay-adjusted alarm message includes an indication of a transfer time in the future in the front side bus clock domain when data to fulfill said read request will be returned from said memory to said front side bus clock domain in response to the read command asserted on said memory bus and the indication is adjusted based on a time delay between said read request and said data becoming present and stable in said host interface, said memory controller configured to calculate said time delay, the transfer time corresponding to a safe clock cycle in said front side bus clock domain; and said data return receiving said alarm message in said memory clock domain at a time before the data is ready for transfer, converting said alarm message in said memory clock domain into an alarm message in said front side bus clock domain, and dynamically monitoring attributes of said read request to generate a programmable offset to said alarm message in said front side bus clock domain, wherein said host interface utilizes said alarm message in said front side bus clock domain to schedule a data ready signal to transfer data at an earliest safe clock cycle in the first clock domain without requiring a synchronous handover in the chip of data fulfilling said read request between said clock domains prior to scheduling the data ready signal.

18. The chip of claim 17, wherein said safe clock cycle comprises an earliest clock cycle in said front side bus clock domain for which data to fulfill said particular read request will be returned and available.

19. The chip of claim 18, wherein said data return generates a data ready signal for said earliest clock cycle.

20. The chip of claim 17, wherein a first wall clock is maintained in said memory controller and a second wall clock is maintained in said data return, said first and second wall clocks being synchronized at some initial time and operated in phase at a rational multiple of each other, whereby a time in said memory controller domain is adapted to be interpreted in said front side bus domain.

21. The chip of claim 17, wherein said attributes of said read request comprise a data size of said read request.

* * * * *